US010925390B2

(12) United States Patent
Reuter et al.

(10) Patent No.: US 10,925,390 B2
(45) Date of Patent: Feb. 23, 2021

(54) RACK FOR A SWITCHGEAR CABINET ARRANGEMENT

(71) Applicant: RITTAL GMBH & CO. KG, Herborn (DE)

(72) Inventors: Wolfgang Reuter, Liebenscheid (DE); Timo Schindler, Gladenbach (DE); Matthias Müller, Dillenburg (DE)

(73) Assignee: RITTAL GMBH & CO. KG

( * ) Notice: Subject to any disclaimer, the term of this patent is extended or adjusted under 35 U.S.C. 154(b) by 442 days.

(21) Appl. No.: 15/781,033

(22) PCT Filed: Sep. 21, 2016

(86) PCT No.: PCT/DE2016/100441
§ 371 (c)(1),
(2) Date: Jun. 1, 2018

(87) PCT Pub. No.: WO2017/092727
PCT Pub. Date: Jun. 8, 2017

(65) Prior Publication Data
US 2020/0274335 A1    Aug. 27, 2020

(30) Foreign Application Priority Data

Dec. 4, 2015  (DE) ..................... 10 2015 121 193.9

(51) Int. Cl.
*A47B 47/00*    (2006.01)
(52) U.S. Cl.
CPC .......... *A47B 47/0008* (2013.01); *A47B 47/00* (2013.01)

(58) Field of Classification Search
CPC . A47B 47/0016; A47B 47/0008; A47B 47/00; A47B 47/005; A47B 47/03;
(Continued)

(56) References Cited

U.S. PATENT DOCUMENTS 3,858,989 A * 1/1975 Field .................. A47B 47/0008
403/171
3,877,138 A * 4/1975 Suchowski ........ A47B 47/0008
29/468

(Continued)

FOREIGN PATENT DOCUMENTS

DE    4336204 C2    11/1996
DE    19615759 A1   10/1997
(Continued)

OTHER PUBLICATIONS

International Search Report (in English and German) and Written Opinion of the International Searching Authority (in German) issued in PCT/DE2016/100441, dated Jan. 25, 2017; ISA/EP.

*Primary Examiner* — Jonathan Liu
*Assistant Examiner* — Devin K Barnett
(74) *Attorney, Agent, or Firm* — Harness, Dickey & Pierce, P.L.C.

(57) ABSTRACT

The invention relates to a rack for a switchgear cabinet arrangement, comprising a main frame that includes four vertical profiled struts and eight horizontal profiled struts, four of said profiled struts forming a rectangular rack frame (4) having a constant cross-section; the rack frame has a peripheral receptacle which is formed by at least two sides of the profiled struts and which is open towards an external side of the rack frame; the disclosed rack is characterized in that a rectangular additional frame is inserted into the receptacle.

15 Claims, 14 Drawing Sheets

Figure 1:
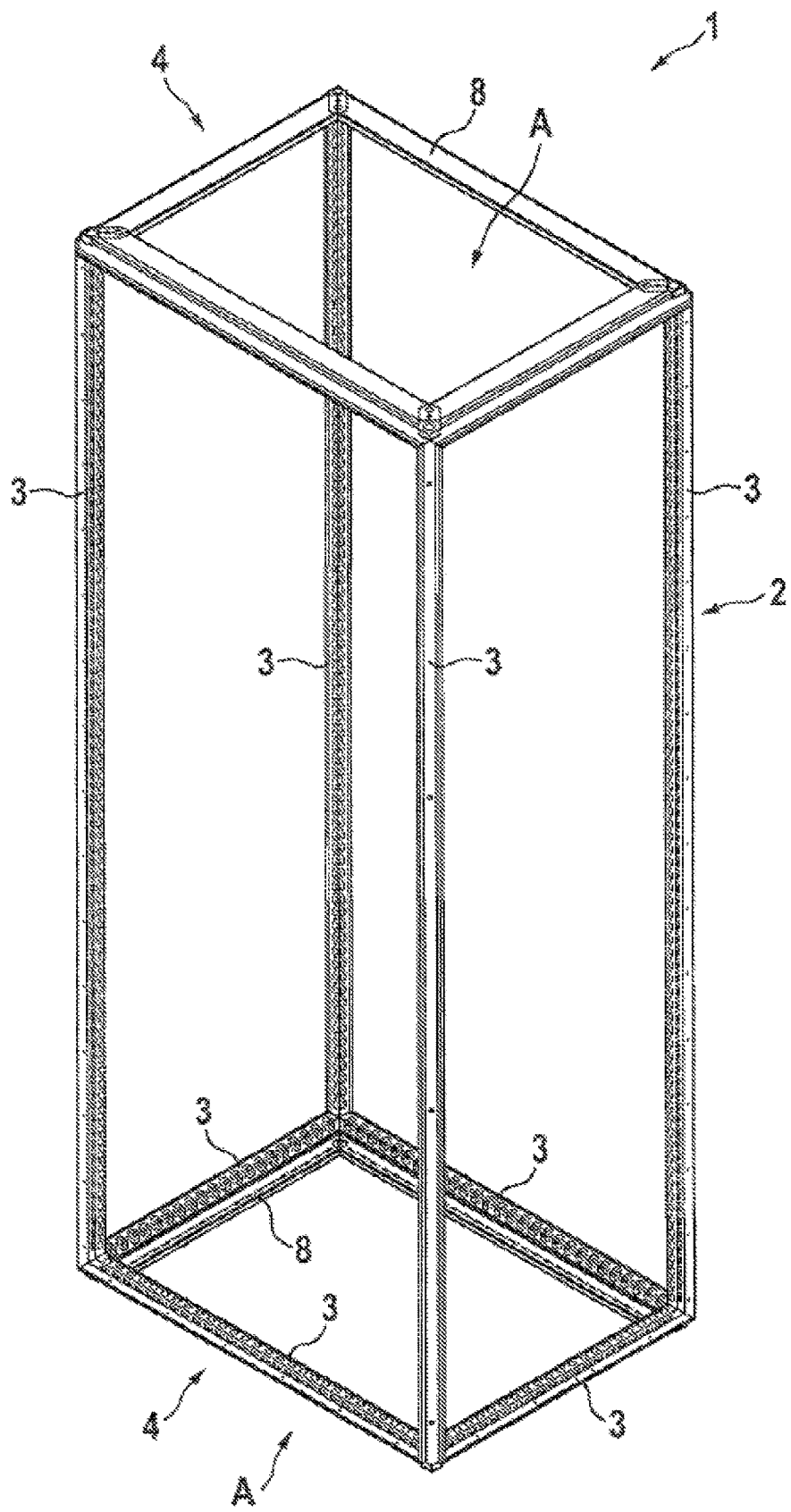

(58) Field of Classification Search
CPC .......... H05K 7/14; H05K 7/18; H05K 7/1487; H05K 7/1488; H02B 1/30; H02B 13/00; H02B 1/012; H02B 1/013; H02B 1/014
See application file for complete search history.

(56) References Cited

U.S. PATENT DOCUMENTS

| | | | | | |
|---|---|---|---|---|---|
| 4,413,570 | A * | 11/1983 | Haigh | ............... | A47B 13/08 108/156 |
| 4,768,845 | A * | 9/1988 | Yeh | ............... | A47B 47/0008 312/257.1 |
| 4,954,007 | A * | 9/1990 | Pinney | ............... | A47B 47/0008 403/172 |
| 5,333,950 | A * | 8/1994 | Zachrai | ............... | H02B 1/301 108/180 |
| 5,380,083 | A | 1/1995 | Jones et al. | | |
| 5,749,476 | A * | 5/1998 | Besserer | ............... | H02B 1/301 211/26 |
| 5,930,972 | A * | 8/1999 | Benner | ............... | H02B 1/01 52/653.1 |
| 6,042,395 | A * | 3/2000 | Munch | ............... | H01R 4/64 439/92 |
| 6,120,206 | A * | 9/2000 | Benner | ............... | A47B 47/03 403/231 |
| 6,138,843 | A * | 10/2000 | Nicolai | ............... | H02B 1/01 211/182 |
| 6,164,460 | A * | 12/2000 | Reuter | ............... | H02B 1/01 211/189 |
| 6,170,673 | B1 * | 1/2001 | Nicolai | ............... | H02B 1/32 211/26 |
| 6,206,494 | B1 * | 3/2001 | Benner | ............... | H02B 1/301 174/50 |
| 6,217,138 | B1 * | 4/2001 | Benner | ............... | H02B 1/01 211/182 |
| 6,231,142 | B1 * | 5/2001 | Pochet | ............... | H02B 1/16 211/189 |
| 6,270,283 | B1 * | 8/2001 | Turati | ............... | H02B 1/01 403/174 |
| 6,516,955 | B1 * | 2/2003 | Dudhwala | ............... | A47B 47/0008 211/182 |
| 6,575,657 | B1 * | 6/2003 | Reuter | ............... | H02B 1/32 403/231 |
| 6,902,068 | B1 * | 6/2005 | Fontana | ............... | H02B 1/01 211/189 |
| 6,965,075 | B2 * | 11/2005 | Suzuki | ............... | H02B 1/01 174/50 |
| 7,896,177 | B1 * | 3/2011 | Toma | ............... | A47B 47/03 211/182 |
| 8,091,970 | B2 * | 1/2012 | Francisquini | ............... | H02B 1/301 312/265.1 |
| 8,225,945 | B2 * | 7/2012 | Fan | ............... | H05K 7/1488 211/26 |
| 8,292,093 | B2 * | 10/2012 | Fan | ............... | H05K 7/1488 211/26 |
| 8,292,380 | B2 * | 10/2012 | Fan | ............... | H05K 7/183 312/265.4 |
| 8,720,700 | B2 * | 5/2014 | Fan | ............... | H05K 7/1488 211/26 |
| 9,496,689 | B2 * | 11/2016 | Boehme | ............... | F16B 2/20 |
| 9,627,860 | B2 * | 4/2017 | Proserpio | ............... | H02B 1/014 |
| 9,871,353 | B2 | 1/2018 | Boehme et al. | | |
| 2001/0050516 | A1 | 12/2001 | Minoura et al. | | |
| 2005/0174020 | A1 * | 8/2005 | Francisquini | ............... | H02B 1/308 312/265.3 |
| 2007/0175648 | A1 * | 8/2007 | Francisquini | ............... | H02B 1/01 174/50 |
| 2010/0314982 | A1 * | 12/2010 | Luo | ............... | A47B 96/14 312/351.1 |
| 2011/0309046 | A1 * | 12/2011 | Lee | ............... | A47B 47/03 211/182 |
| 2012/0012543 | A1 * | 1/2012 | Fan | ............... | H05K 7/1488 211/26 |
| 2013/0069501 | A1 * | 3/2013 | Liu | ............... | A47F 5/01 312/223.1 |
| 2013/0221813 | A1 * | 8/2013 | Maisch | ............... | H02B 1/306 312/107 |
| 2016/0352080 | A1 | 12/2016 | Brueck et al. | | |
| 2016/0352082 | A1 * | 12/2016 | Boehme | ............... | H02B 1/013 |
| 2016/0352083 | A1 * | 12/2016 | Brueck | ............... | H05K 7/14 |
| 2016/0363150 | A1 * | 12/2016 | Schindler | ............... | F16B 12/50 |
| 2017/0265320 | A1 | 9/2017 | Muller | | |
| 2018/0116400 | A1 * | 5/2018 | Lu | ............... | A47B 96/1408 |
| 2018/0375302 | A1 * | 12/2018 | Reuter | ............... | H02B 1/014 |
| 2019/0116972 | A1 * | 4/2019 | Tao | ............... | A47B 47/0008 |

FOREIGN PATENT DOCUMENTS

| | | |
|---|---|---|
| DE | 19813222 C1 | 11/1999 |
| DE | 102014101404 A1 | 8/2015 |
| RU | 2456726 C2 | 7/2012 |

* cited by examiner

RACK FOR A SWITCHGEAR CABINET ARRANGEMENT

CROSS-REFERENCE TO RELATED APPLICATIONS

This application is a 371 U.S. National Stage of International Application No. PCT/DE2016/100441, filed on Sep. 21, 2016, which claims priority to German Application 10 2015 121 193.9, filed on Dec. 4, 2015. The entire disclosures of the above applications are incorporated herein by reference.

FIELD

The invention relates to a rack for a switchgear cabinet arrangement, comprising a main frame that includes four vertical profiled struts and eight horizontal profiled struts, of which four profiled struts form a rectangular rack frame having a constant cross section, and wherein the rack frame has a peripheral receptacle which is formed by at least two profile sides of the profiled struts, which is open toward an external side of the rack frame. Such a rack is known from DE 10 2014 101 404 A1 and from US 2001/0050516 A1.

DE 43 36 204 C2 discloses a rack that has a main frame of twelve profiled struts that are rectangular in cross section, all of which are flanked on the outside by means of an additional profile that is open in cross section.

BACKGROUND

This section provides background information related to the present disclosure which is not necessarily prior art.

The racks known from prior art often have the disadvantage that they are not equipped to be able to react flexibly to different requirements according to the application, especially in regard to the respectively required minimum mechanical load-bearing capacity. The result of this is that the cross sectional geometries of the profiled struts of the racks are designed for maximum load capacity, which is superfluous for many applications. The switchgear cabinet manufacturer can also often not foresee what application a customer will later make of the switchgear cabinet. Accordingly, racks, as a rule, use excess material, when measured against their specific application, or they are produced using unnecessarily complex manufacturing procedures for the building of complex and especially rigid cross sectional geometries, in order to be prepared for all conceivable requirement profiles.

SUMMARY

This section provides a general summary of the disclosure, and is not a comprehensive disclosure of its full scope or all of its features.

It is therefore an aspect of the invention to propose a rack frame for a switchgear cabinet arrangement which can be flexibly adapted depending on the application, wherein the proposed rack fame not only is to be variable in regard to its loading capacity, but in addition also make it possible, if needed, to provide an additional function.

Accordingly, provision is made that a rectangular additional frame is inserted into the receptacle. Depending on the application, the additional frame can be inserted into one of the external sides of the rack frame, into the receptacle there formed from the respective rack frames, so as to reinforce the rack frames, or to make available an additional support side or assembly side for an additional component.

For example, the additional frame can be a base frame which is inserted into the rack frame formed by the four lower horizontal struts, in order, with the aid of the additional frame, to mount the main frame onto a switchgear cabinet base, or along the inner perimeter of the main frame to provide an additional support and/or assembly side with attachment receptacles for mounting a base pan.

The additional frame can also be a roof frame, which is placed on the rack frame formed by the four upper horizontal profiled struts, such as for assembly of a roof structure such as a roof air conditioner.

In the same way, it is conceivable that the additional frame is inserted from outside in the receptacle of the rack frame, on one of the vertical sides of the main frame, which is formed by a rack frame that is formed from two vertical and two horizontal struts, and if necessary is secured on the rack frame. Such an arrangement can for example be provided, to increase the load capacity of the rack frame in the vertical direction. Further, it is conceivable with the aid of such an additional frame to prepare the rack to be lined up on an adjoining rack. Applications that extend beyond this are conceivable.

A main frame with a cubic geometry, assembled from eight horizontal profiled struts and four vertical profiled struts, has six rectangular rack frames according to the invention, with the rack frames bordering one of the six imaginary cubic surfaces of the main frame. It is conceivable that only one of the six rectangular rack frames of the main frame is provided with an additional frame, or that multiple rack frames are provided with an additional frame. If all twelve profiled struts have the same profile cross section, what is achieved is that the main frame can be produced in cost-effective fashion, and that only one type of additional frame needs to be prepared for universal application, for the vertical side surfaces as well as the horizontal base and roof surfaces.

It can also be foreseen that for a rack frame, multiple additional frames are prepared with differing profile cross sections, to thus enable reaction to differing requirements. When the main frame, in the process, has an identical peripheral profile cross section, it is then already possible to flexibly react to a multitude of requirements by means of a small number of additional frames with various cross sectional geometries.

The receptacle can have a support side for the additional frame. The receptacle can further have a connection side, by means of which the support side is connected with an external profile side or an outer edge of the rack frame. The receptacle can be set up to partially receive the additional frame, in other words not fully, so that the additional frame has a section protruding out of the receptacle of the rack frame. However, the additional frame can also be fully received in the receptacle.

Additionally, the profiled struts of the additional frame can exhibit a peripheral closed hollow-profile cross section. They also can exhibit a hollow-profile cross section with an open profile side, which is received in the receptacle and closed by a profile side of the profiled strut of the main frame.

The additional frame can be assembled from individual profiled struts that are connected with each other in fixed fashion or loosely. In particular, it can be foreseen that during manufacture of the rack, the rack frame of the rack is equipped with four individual profiled struts that are first assembled and/or aligned by means of their relative arrangement to each other in the receptacles of the rack frame for formation of the additional frame. The individual profiled struts prepositioned in this way can, if needed, be connected with each other and/or with the profiled struts forming the rack frame, for example by screwing or welding. Equipping the receptacle with individual profiled struts has an advantage over using a fixed, pre-assembled complete additional frame, in that during production of rack frames and additional frames, more limited manufacturing tolerances need to be maintained. In particular, the individual profiles of the additional frame and, if necessary, a corner connector of the additional frame, which, for example, can have a dual function and also be the corner connector of the rack frame, can be designed to make a compensation of any manufacturing tolerances of the rack frame possible during assembly of the individual profiles in the receptacle. For this, the corner connectors can have compensation elements and/or attachment receptacles for bolts configured as elongated holes, by means of which the individual profiles of the additional frame are connected with the corner piece.

The profiled struts of the rack, especially of the rack frame, can have a peripheral closed hollow-profile cross section. In addition, they can have at least one assembly plane that is offset from a sealing plane to an inner area of the rack. For example, the profiled struts can have a geometry as is disclosed in DE 10 2014 101 404 A1. Additionally, the profiled struts can have a geometry as is disclosed in the patent disclosure document DE 10 2015 121 193.9 A1 of a German patent application disclosed on the same day.

The support side and the connection side can each have a support surface on which the additional frame adjoins in form-fitting fashion, at least in sections, with the adjoining surfaces extending toward each other at an angle, especially at an angle of 90°. The additional frame received in the receptacle can be connected with the rack frame of the main frame by means of attachment. A screwed connection is conceivable as the means of attachment. Alternatively, or additionally, the additional frame can be welded to the rack frame.

The additional frame can adjoin on at least one of the support surfaces by means of a sealing means. Especially when the addition frame forms a base frame on which the base-side rack frame of the main frame stands, the sealing means can aid in preventing moisture from penetrating through the receptacle into the interior of a switchgear cabinet surrounded by the main frame. For this, additionally, an external profile side that forms a standing side of the additional frame, with which the additional frame stands on a base, such as a switchgear cabinet base, can be completely closed and thus especially have no attachment receptacles or other apertures. In this way, with the aid of the additional frame, what is attained is a particularly high IP protective capability, which is very relevant in switchgear cabinet design.

It is also conceivable to form a channel in the receptacle between the rack frame and the additional frame, which is opened at the corners of the rack frame and/or of the additional frame. In this manner, with the still liquid paint during the dip painting, one can, on the one hand, achieve a better penetration of the paint between the rack frame and the additional frame, and on the other hand, a better outflow. The channel can be configured by having an insertion section of the additional frame, by means of which the additional frame is inserted into the receptacle, that does not completely fill the receptacle, but rather, for example, leaves free space in a corner area of the receptacle, which extends over the entire length of the rack frame or alternatively the additional frame.

The additional frame can project beyond the inner periphery of the rack frame and have an assembly and/or support side that is parallel to the outer side of the rack frame. This assembly and/or support side can be arranged to face the interior of the rack, and serve, for example, for mounting attachments from the inner side of the rack or the switchgear cabinet assembled therewith.

The additional frame can have four additional profiled struts, which on their ends are connected at a 90° angle by means of a corner piece with another of the additional profiled struts. At least one of the corner pieces has a connection piece that penetrates by means of a cutout in the receptacle, in a corner area of the rack frame, into the rack frame, and there is received in form-fitting and/or force-fitting fashion. The connection pieces can, for example, assist in pre-positioning the additional frame in regard to the rack frame, in such a way that the additional frame can simply be slid into the receptacle formed by the rack frame. This avoids tilt misalignments between the rack frame and the additional frame when being inserted. Additionally, with the help of the connection pieces, the additional frame can be precisely prepositioned in relation to the rack frame, so that, subsequently, further measures need only be taken as required for a force-fitting connection between the rack frame and additional frame. This can for example include screw connection between the rack frame and additional frame and/or welding of the two to each other.

When the additional frame is a base frame and is placed on the main frame, the additional frame can have vertical apertures, by means of which it is secured on a switchgear cabinet base. With this, the additional frame can have four additional profiled struts, angled at their ends at a 45° angle to their extension direction, each of which at their ends is connected with one of the other profiled struts by a corner piece, while forming a 90° angle. Provision can be made that the angled profile ends of the additional profiled struts each has a cutout, so that with the profiled struts connected with each other by means of the corner pieces, the cutouts of adjoining profiled struts form one of the apertures. What is attained in this way is that when screw connection is made of the additional frame assembled from the profiled struts and corner pieces, to a switchgear cabinet base or the like, while eventually using a lock washer, the additional profiled struts are also connected to each other at the same time.

The corner piece can have a tab with at least one additional aperture, wherein the tab extends over the angled ends of the additional profiled struts into the adjoining additional profiled struts, and wherein one of the apertures in the additional profile aligns with another aperture in the tab. The aligning apertures can be used for a screw connection such as by a screw or a threaded bolt shaped in some other way, to connect the additional frame on a support surface, such as a switchgear cabinet base, whereby a simultaneous fixation of the corner pieces in reference to the other profiled struts of the additional frame is achieved with the screw connection by means of the alignment aperture.

The additional frame can be received in form-locked fashion in the receptacle, with the receptacle having a constant cross section in a direction of insertion for the additional frame into the receptacle.

In the direction of insertion for the additional frame into the receptacle, the receptacle can have a dimension that matches a dimension of the additional frame in the direction of insertion, so that with the additional frame inserted into the receptacle, an outer profile side of the additional frame aligns with an outer profile side, or an outer edge, of the rack frame.

The support side can be aligned perpendicular to the direction of insertion for the additional frame into the receptacle, and the connection side can be aligned parallel to the direction of insertion. With this, the support side can make a transition on opposing edges into an inner peripheral side of the rack frame and into the connection side, wherein the inner peripheral side extends parallel to the connection side. The connection side and the inner peripheral side can be arranged to be offset to each other by the dimension of the support side perpendicular to the edges.

The rack frame can have a closed profile cross section and the additional frame can have an open profile cross section, wherein, in this case, an open profile side of the additional frame is closed by at least one closed profile side of the receptacle of the rack frame, when the additional frame is received in the receptacle.

The geometry of the additional frame is not limited to any determined geometries. The additional frame can, however, have an insertion section, by means of which the additional frame is inserted into the receptacle. The geometry of the insertion section can be designed so that when the additional frame is inserted into the receptacle, a guide surface of the insertion section is guided along a corresponding guidance surface of the receptacle, for example along the connection side. With this insertion process, the support side of the receptacle can especially have the function of a stop that limits the insertion motion, so that with an additional frame adjoining the support side, a defined end position of the additional frame is reached in regard to the rack frame.

Also, the additional frame can have an attachment section with assembly openings. The assembly openings can be configured on a profile side of the attachment section which faces the interior of the rack. However, the assembly openings can also be opened toward the respective external side of the rack frame. The attachment section can especially be designed to project beyond an interior peripheral side of the rack frame to the interior of the rack. With this, the additional frame with the attachment section can adjoin the attachment section on the inner peripheral side of the rack frame, when the additional frame is inserted by means of the insertion section into the receptacle. The additional frame can project beyond the inner peripheral side of the rack frame, especially in the plane of the rack frame.

Use of an additional frame especially makes it possible to manufacture the same from a material that differs from the main frame. In this respect, it is also possible to react to a strength requirement or other conditions through the selection of materials. In particular, this permits the additional frame, for example, to be made of a plastic material, for example of a glass-fiber-reinforced plastic. Furthermore, the additional frame can be manufactured from a non-electrically-conducting material, in this way to electrically insulate between the components mounted by means of the additional frame and the main frame of the rack.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
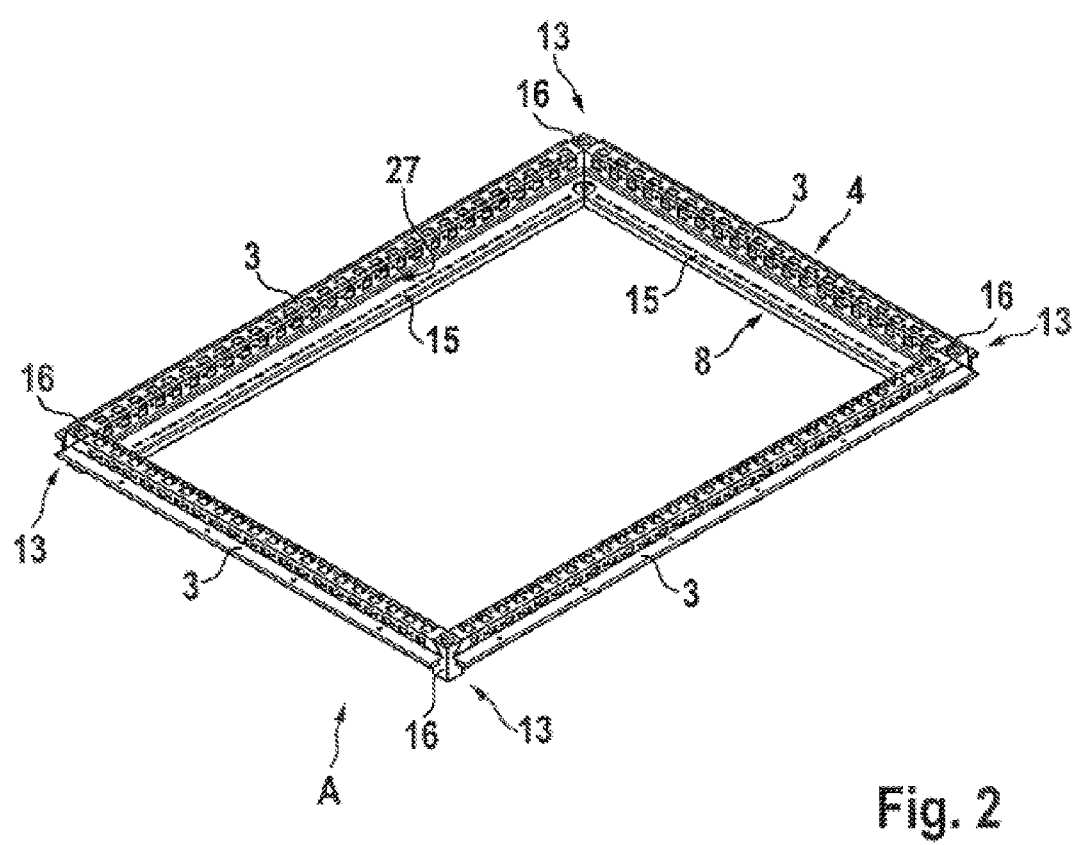
Figure 3:
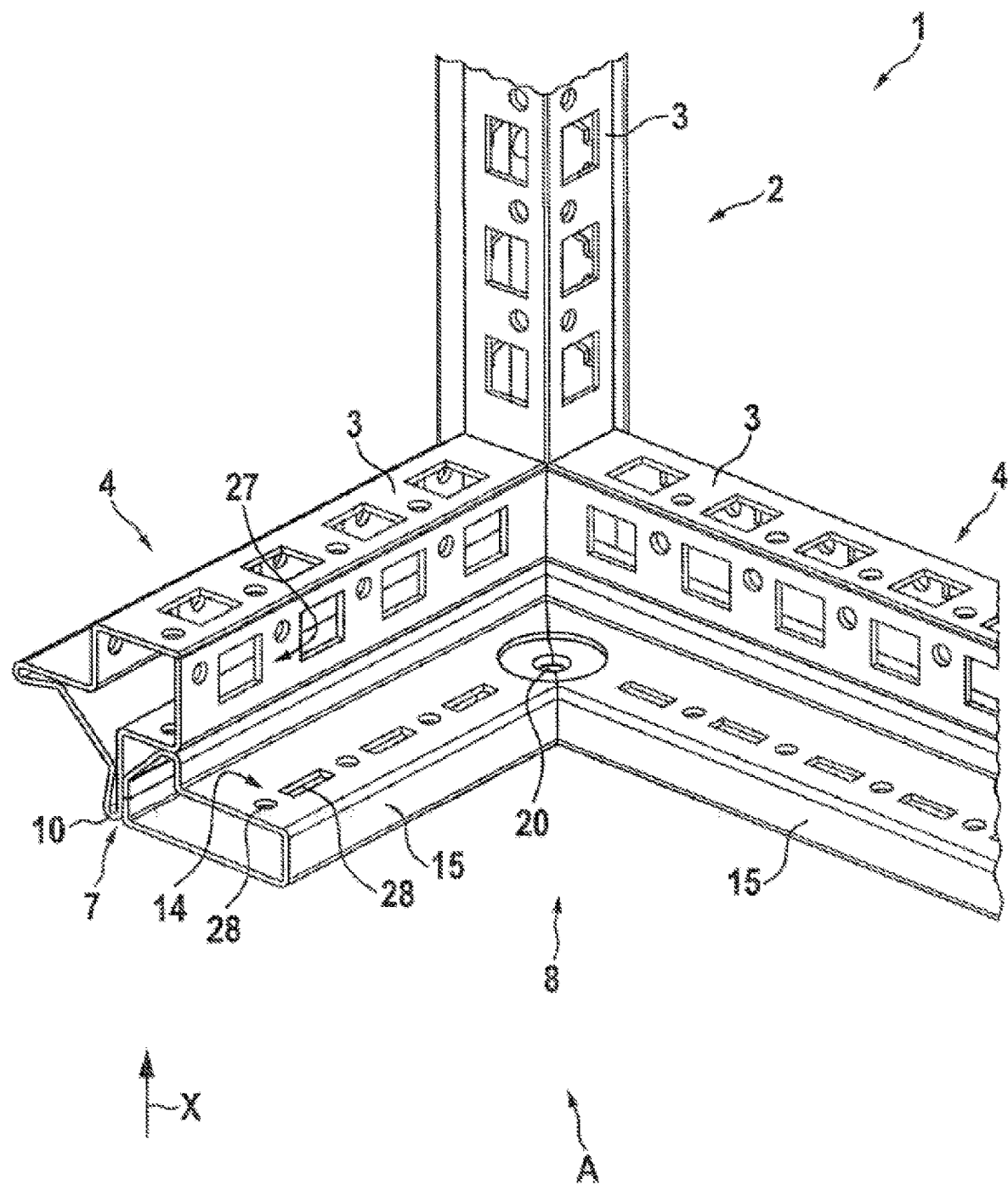
Figure 4:
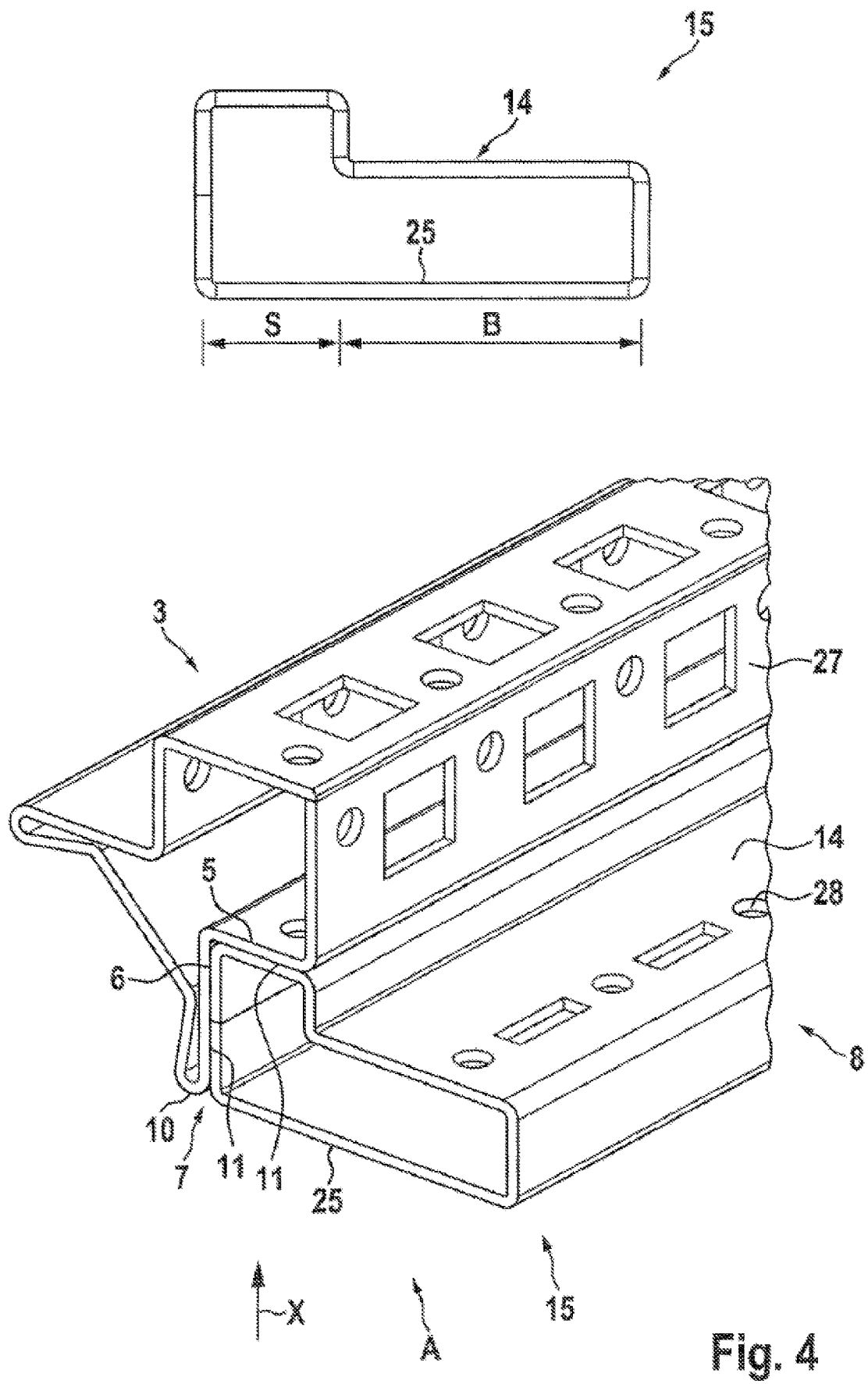
Figure 5:
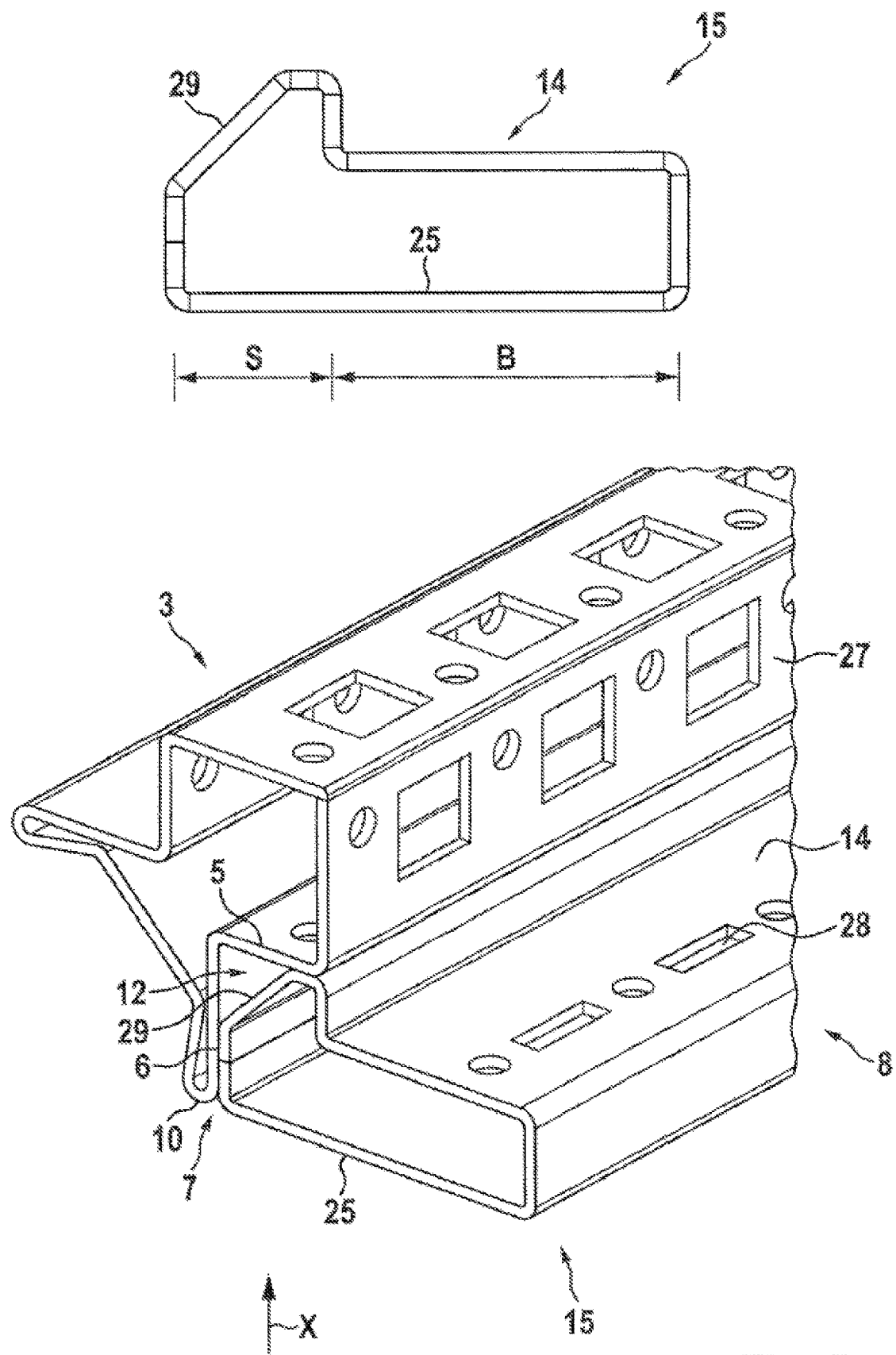
Figure 6:
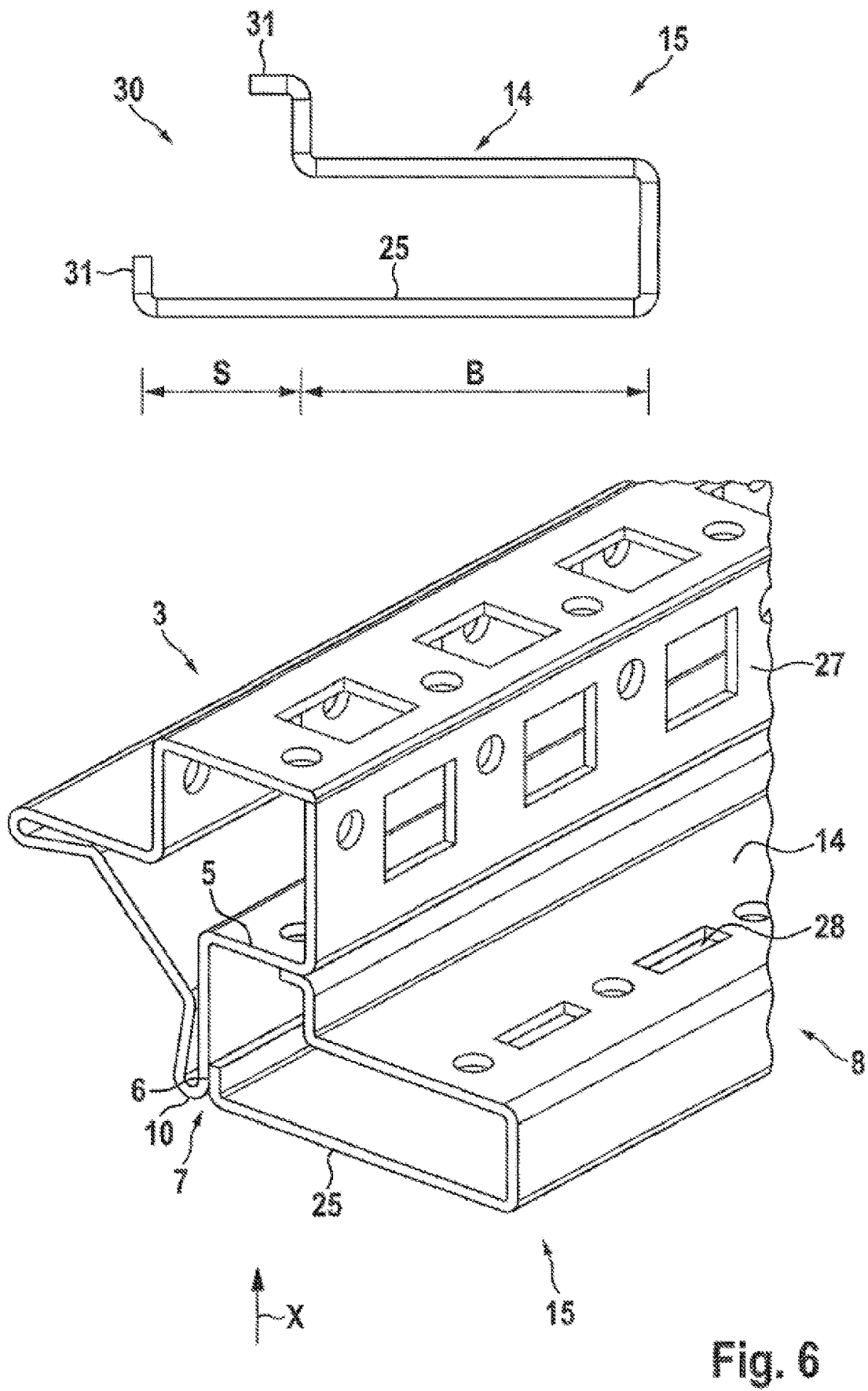
Figure 7A:
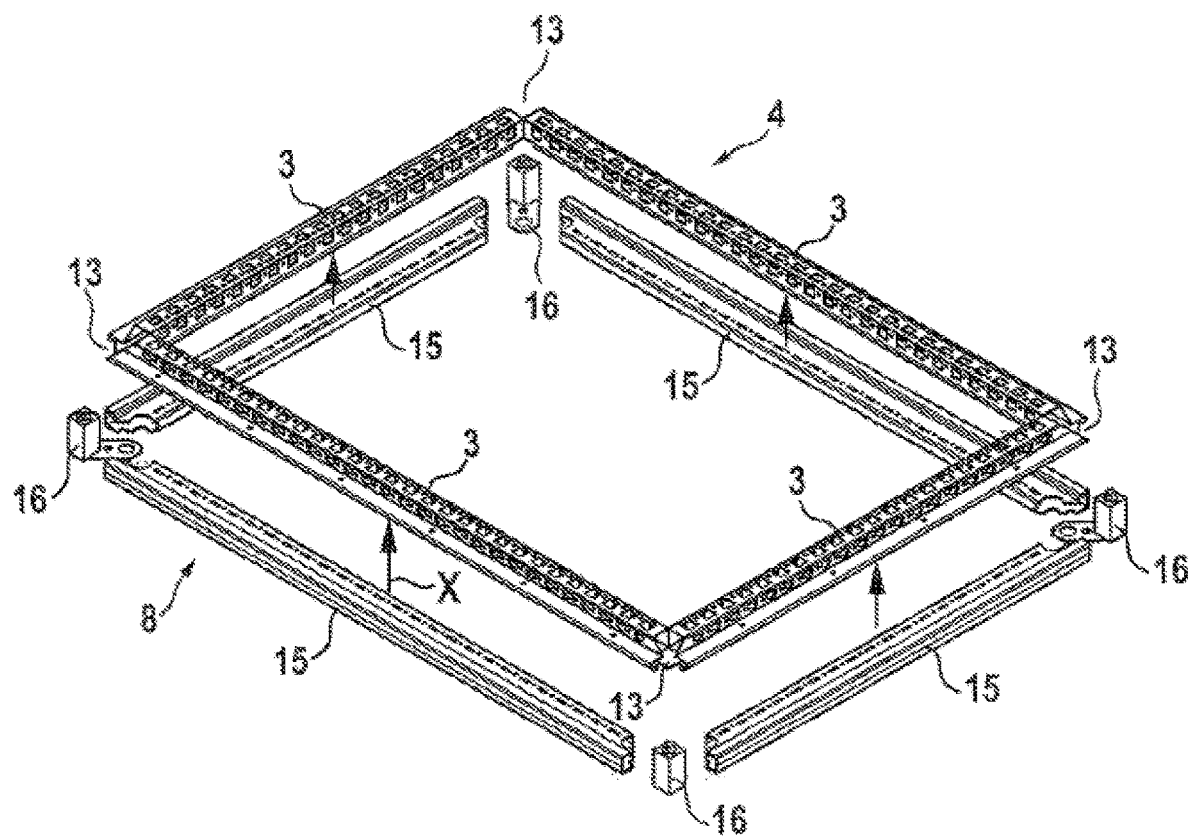
Figure 7B:
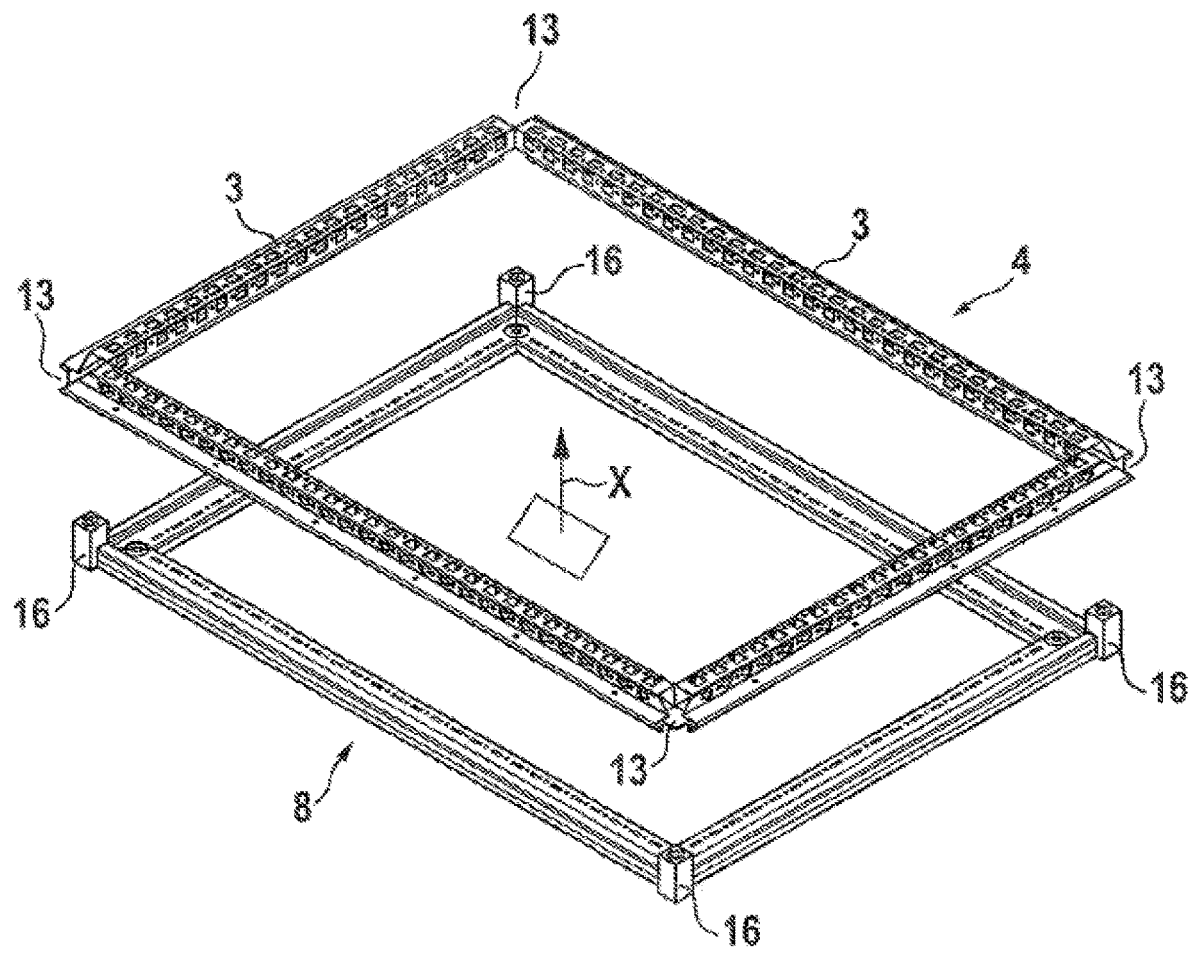
Figure 8:
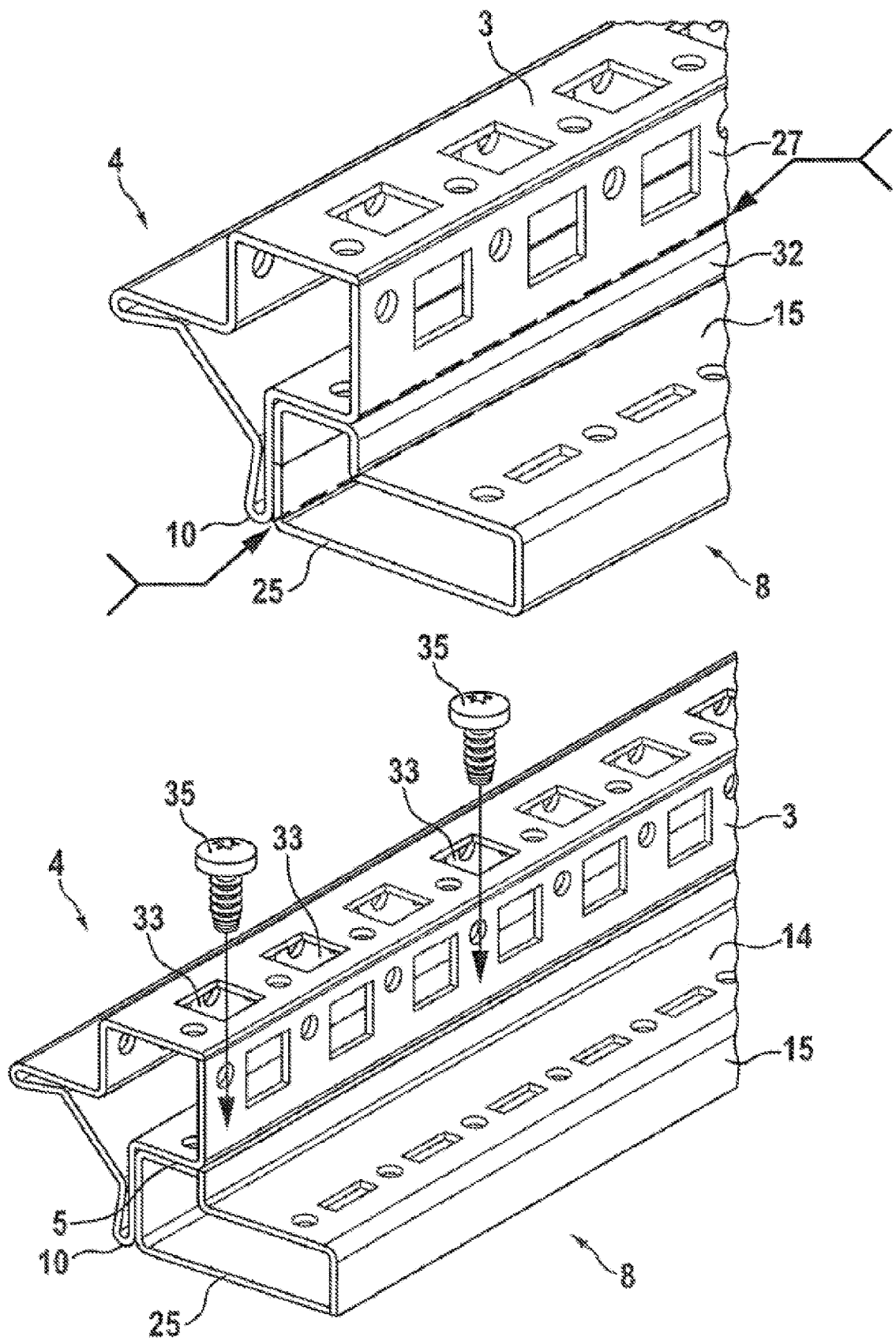
Figure 9:
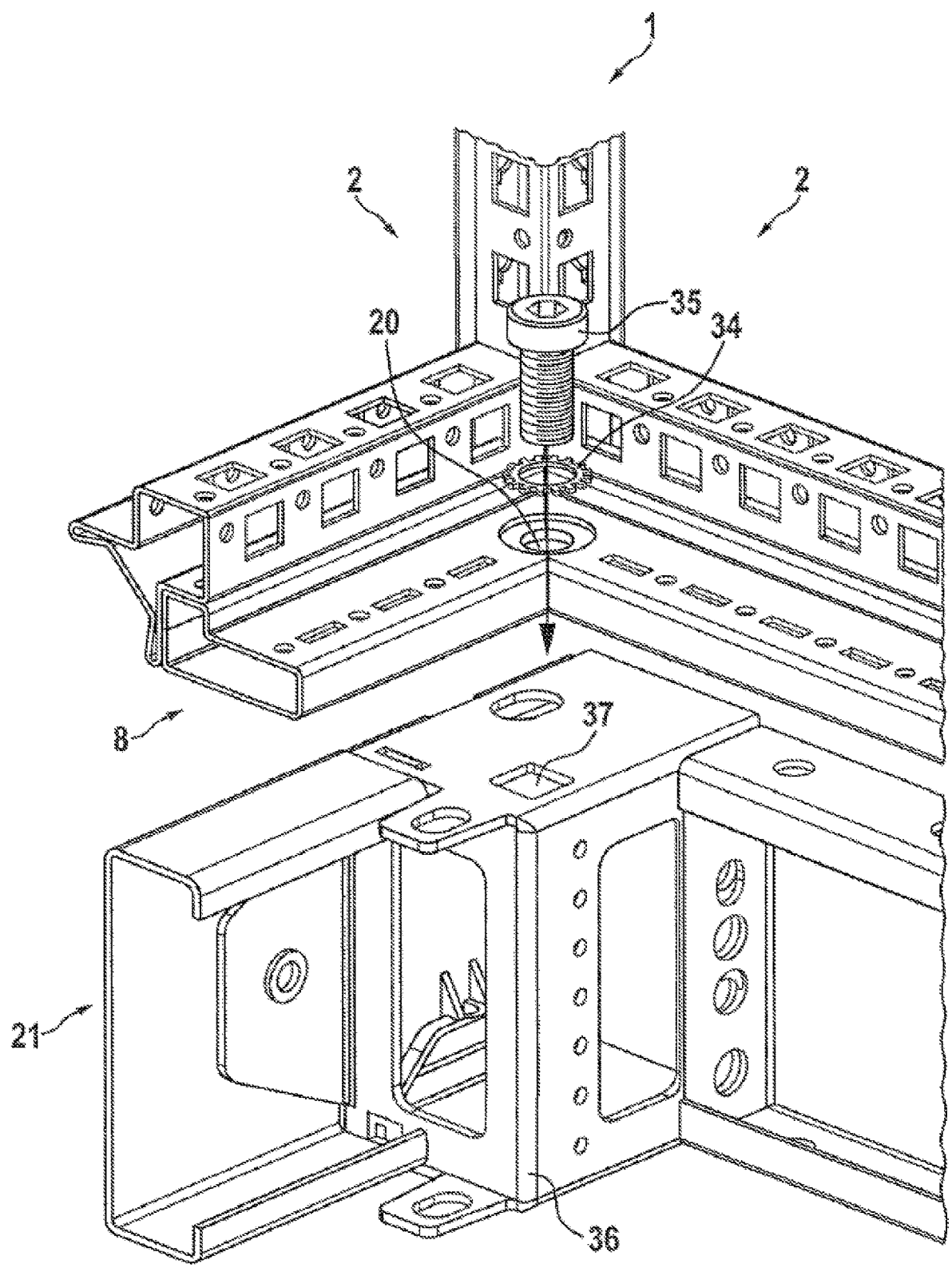
Figure 10:
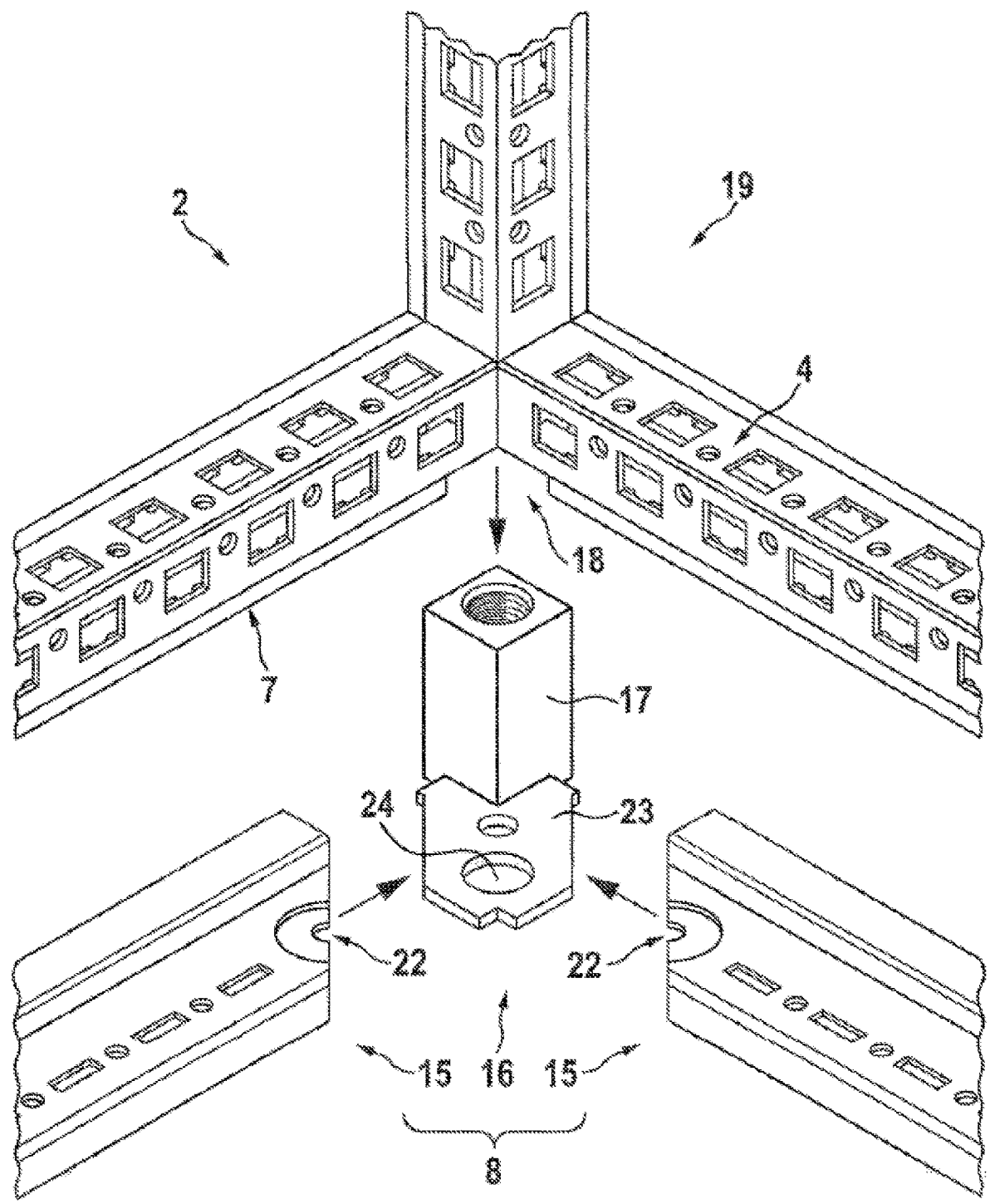
Figure 11:
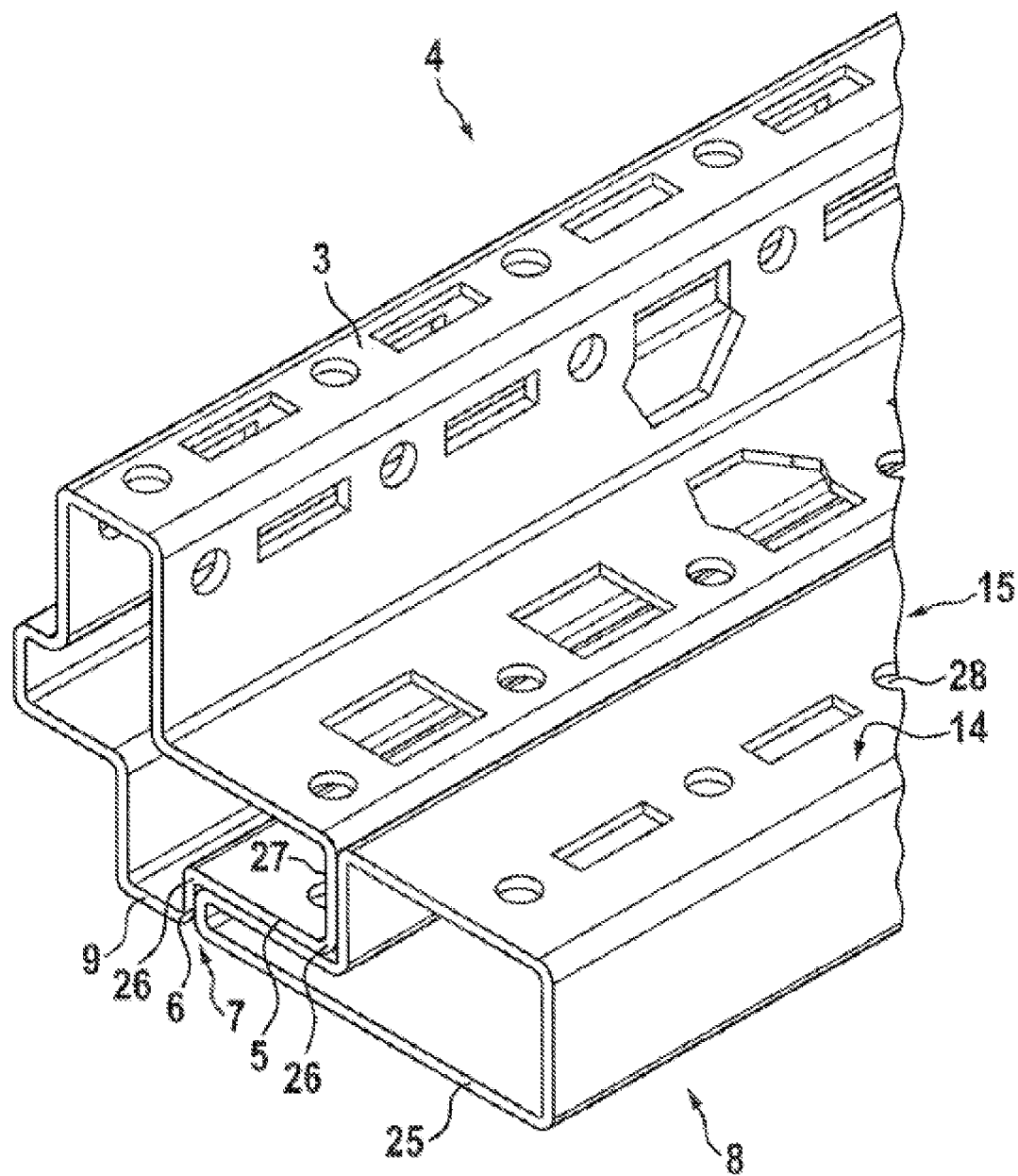
Figure 12:
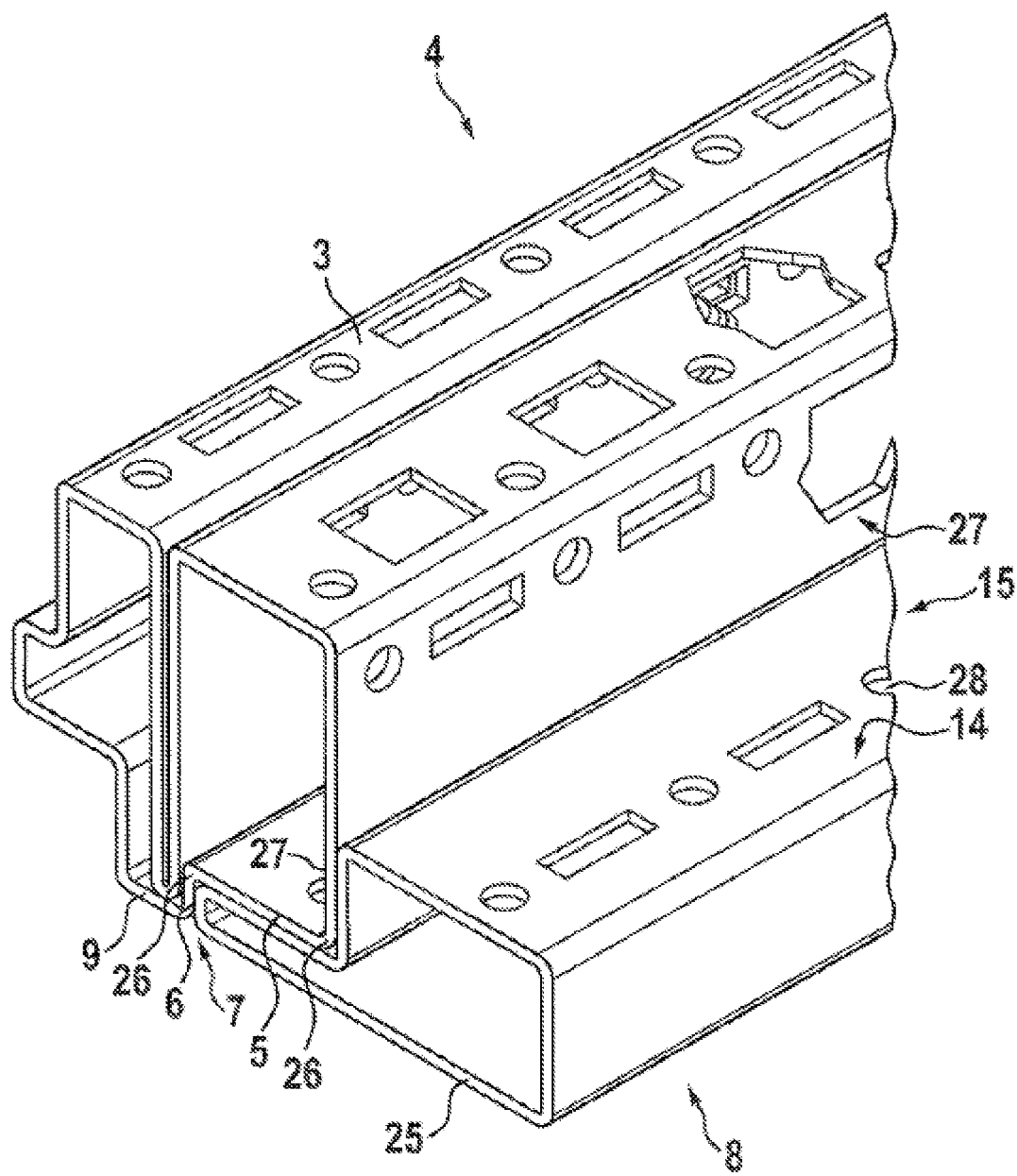
Figure 13:
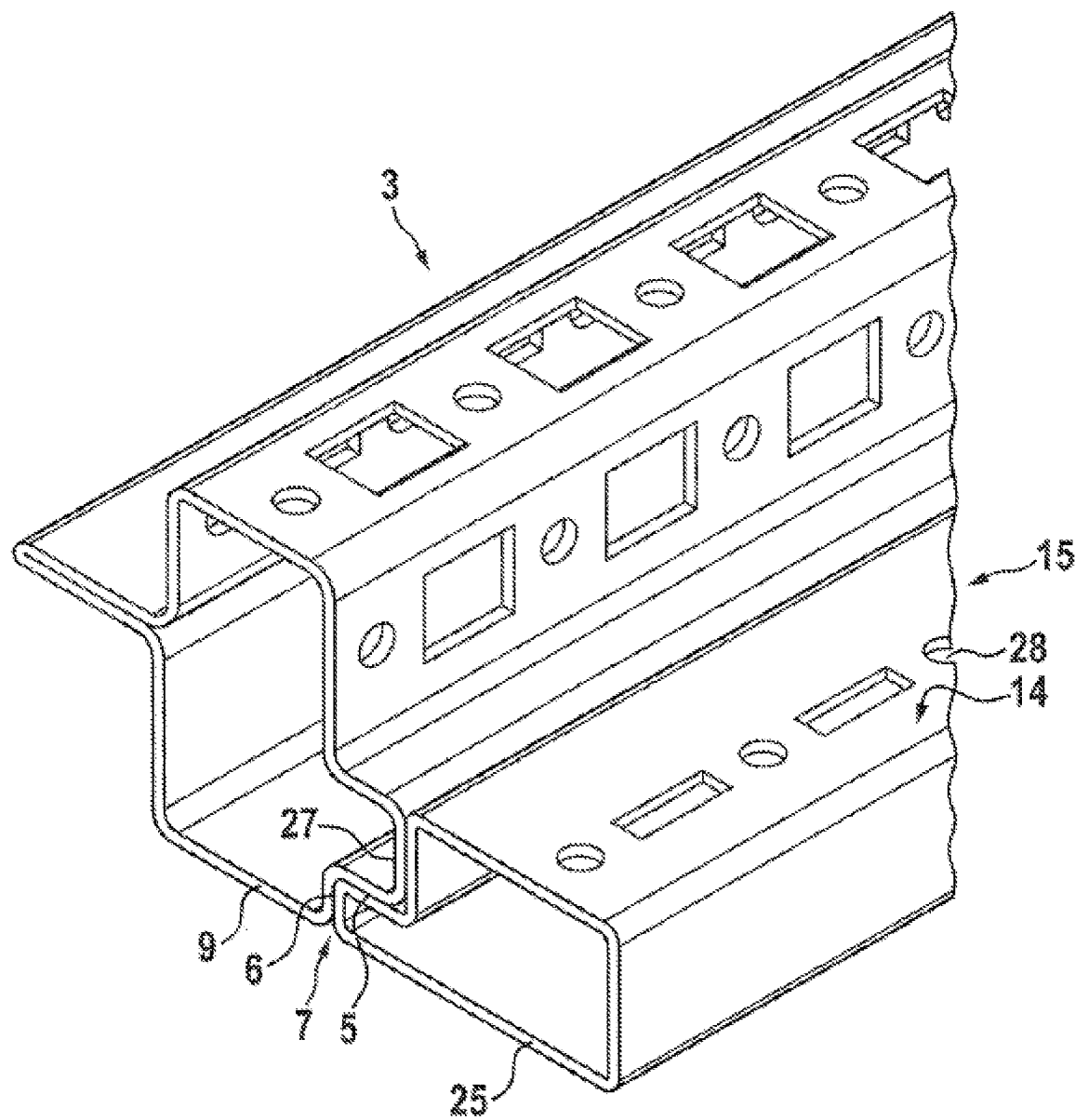

Further particulars of the invention are explained with the aid of the following figures. Shown are:

FIG. 1 a perspective view of an exemplary rack;

FIG. 2 the base assembly of the rack of FIG. 1;

FIG. 3 the corner area of the base assembly of an exemplary rack;

FIG. 4 a perspective cross-sectional view of another rack;

FIG. 5 a perspective cross-sectional view of still another rack;

FIG. 6 a perspective cross-sectional view of still another rack;

FIGS. 7*a* and 7*b* schematic views of two possible ways of joining rack frames and additional frames;

FIG. 8 two possible ways to attach the additional frame to the rack frame;

FIG. 9 attachment of a rack to a switchgear cabinet base;

FIG. 10 connection of the additional frame with the rack frame with use of a corner piece; and FIGS. 11-13 additional cross sectional geometries of possible combinations of profiled struts for the rack frame and the additional frame.

DETAILED DESCRIPTION

Example embodiments will now be described more fully with reference to the accompanying drawings.

FIG. 1 shows an exemplary rack 1, which is composed of a main frame 2 and additional frames 8 on the base side and roof side. The additional frames 8 are joined from external side A to the main frame. For example, for this, the lower additional frame 8 can be joined to a sub-base or for example secured to a switchgear cabinet base, whereupon the main frame 2 is set on the bottom-side additional frame 8. The roof-side additional frame 8 is joined from the roof-side external side A of main frame 2 to the main frame 2. The main frame 2 has four vertical and eight horizontal struts, which all have the same cross sectional geometry.

As can be recognized, the additional frame 8 projects beyond the bottom-side and roof-side rack frames 4 on the inner peripheral side of the profiled struts 3 facing the interior of the switchgear cabinet. In the case of the bottom-side additional frame 8, the part of the additional frame 8 that projects inward beyond the bottom-side rack frame 4 forms an assembly and support side, which for example can be used for assembly of a base pan of a switchgear cabinet. With the assistance of the roof-side additional frame 8, a horizontal assembly plane is made available, on which, for example, a roof structure in the form of an air conditioner, or the like, can be set up and mounted.

The additional frames 8 can be connected in permanent or detachable fashion with the main frame 2. It can in particular be foreseen that, at least one additional frame 8, can, if necessary, be retrofitted by an end user, for which between main frame 2 and additional frame 8, screw connections are provided. More detailed particulars on this are shown in FIG. 8.

FIG. 2 shows, in exemplary fashion, the bottom group of rack 1 according to FIG. 1. The same consists of the bottom-side rack frame 4, on which, the additional frame 8 is attached from the external side A of the main frame 2 from FIG. 1. Since FIG. 2 shows the bottom group, in the depiction according to FIG. 2, the additional frame 8 is consequently attached from below to the rack frame 4, or alternatively, the rack frame 4 according to FIG. 1, onto the additional frame 8.

The rack frame 4 has a rectangular geometry and consequently is composed of two times two equally long profiled struts 3. These are connected at their corners 13 by corner pieces 16 to rectangular rack frame 4. The additional frame 8 is correspondingly composed of four additional profiled struts 15, which project beyond an inner peripheral side 27 of the rack frame 4 in the direction of the interior of the frame. The corner pieces 16 can be configured in such a way that they serve both for connection of the additional profiled struts 15 of the additional frame 8, as well as also for connection of the profiled struts 3 of the rack frame 4. For this, it can be foreseen that the additional profiled struts 15 of the additional frame 8 are screw-connected with each other by means of the corner pieces 16, whereas the additional frame 8, pre-mounted in this way, is connected in a following assembly step by means of the same corner pieces 16 with the rack frame 4, for example through welds or screw-connections.

FIG. 3 shows the corner area of a bottom group of an exemplary rack 1. As can be recognized, both the horizontal struts 3 of main frame 2 and vertical profiled struts 3, are designed to have an identical cross section. By the fact that base frame thus uses only one profile type all around, it is able to be manufactured simply and cost-effectively. However, to give additional strength to the rack frame formed from horizontal profiled struts 3, an additional frame 8 is inserted into the receptacle 7 of the rack frame 4 from the external side A, which is to say in the depiction of FIG. 3, from below, by an insertion motion in the direction of insertion X. In the corner area, the additional frame 8 has an aperture 20, by which the additional frame 8 can, for example, be secured to a switchgear cabinet base. The aperture 20 is configured in a profile section of the additional frame 8, which projects beyond the inner peripheral side 27 of the rack frame 4 in the direction of the frame interior. Assembly openings 28, such as for assembly of a base pan or the like, are configured on one assembly and/or support side 14, which is turned toward the rack frame interior, and with which the additional frame 8 projects beyond the inner peripheral side 27 of the rack frame 4. It is recognizable that receptacle 7 has a uniform geometry in the direction of insertion X. This is explained in detail with reference to FIGS. 4-6.

FIGS. 4-6 show the various geometries for the additional frame 8, which are each combined with the same base frame geometry. The profiled struts 3 of the main frame 2 have a receptacle 7, which is open both toward the external side A, and toward the interior of the rack frame 4 formed by the profiled struts 3. The receptacle 7 is in essence formed from a support side 5 and a connection side 6 folded therefrom, wherein the support side 5 is connected by means of the connection side 6 with an outer edge 10 of the profiled strut 3. In a section on the end side that is received in receptacle 7, the additional frame 8 has a dimension in the direction of insertion X, which precisely matches the length of connection side 6, so that when the additional frame 8 is fully inserted in the direction of insertion X into the receptacle, an external, bottom-side profile side 25 of the additional frame 8 aligns with the outer edge 10 of the rack frame 4, so that the outer edge 10 and the external profile side 25 form a flat support surface. The support side 5 forms a bearing surface for the additional frame 8 when the same is slid into the receptacle 7 along the direction of insertion X. A sealing agent 11 is placed between the connection side 6 and/or the support side 5 and the additional frame 8, to keep moisture from entering from external side A through the receptacle 7 into the space enclosed by the main frame. The external profile side 25 of the additional frame 8 is also closed over the full surface for this purpose and in particular has no assembly openings or the like, to keep moisture from penetrating by means of the external side A. The assembly and/or support side 14, which faces the interior of the switchgear cabinet, is located at a vertical distance from the external profile side 25 and offers an attachment option, for example, for a base pan. For this, assembly openings 28 are provided.

The additional frame 8 is assembled from profiled struts 15, which have the cross section shown in the upper area of FIG. 4. The cross section of the additional profiled strut 15 is divided into an insertion section S, by means of which the additional frame is inserted into the receptacle 7, and an attachment section B, with which the additional frame 8 projects inward beyond the inner peripheral side 27 of the rack frame 4 and into the plane formed by the rack frame 4.

In a departure from the embodiment according to FIG. 4, in the embodiment according to FIG. 5, the cross section of the insertion section S of the additional profiled strut 15 is provided with a slanted side 29, which causes the additional frame 8, when fully inserted into the receptacle 7, to not fully fill out the receptacle 7, leaving instead, in a corner area of receptacle 7, a free channel, which extends in the longitudinal direction of the profiled struts 3, 15. Hereby, the discharge of the paint can be facilitated when doing dip coat coating. Additionally, a savings in material is achieved through the slanted surface resulting from the slanted side 29, when compared to the profiled strut 15 according to FIG. 4. As can be recognized, the insertion section however adjoins both the support side 5 and the connection side 6 in form-fitting fashion, in turn to achieve a defined positioning of the additional frame 8 in reference to the profiled strut 3.

In the embodiment shown in FIG. 6, the cross section of the additional profiled strut 15 of the additional frame 8 exhibits an open profile side 30, wherein the open profile side 30 is precisely a part of the insertion section S, which with the additional frame 8 inserted into the receptacle 7, is facing the connection side 6 and/or the support side 5. What is achieved by this is that with the additional frame 8 fully inserted into the receptacle 7, the open profile side 30 of the additional frame 8 is closed by the support side 5 and/or the connection side 6. Also with this embodiment, in turn it is recognized that despite the open profile side 30, the insertion section comes to adjoin the support side 5 or the connection side 6, respectively, at least by means of the angled profiles 31 that extend at right angles to one another, and in turn to achieve a defined positioning of the additional frame 8 with reference to the profiled strut 3, when the additional frame 8 is fully inserted into the receptacle 7.

In reference to FIGS. 7a and 7b, two possible ways are shown for the connection of the additional frame 8 to the rack frame 4. Whereas in the version shown in FIG. 7a, both the profiled struts 15 of the additional frame 8 and the profiled struts 3 of the rack frame 4 are connected as individual profiles by means of the corner pieces 16 with each other, in the version according to FIG. 7b, provision is made that the additional frame 8 is pre-mounted by means of the corner pieces 16, to position the profiled struts 3 of the rack frame 4 in a following step. A retrofit solution is also conceivable, in which the already completely assembled main frame 2 is subsequently equipped with an additional frame 8. The type of connection of the additional frame to the main frame can depend on whether this is already to occur as part of the rack manufacturing process, or whether a retrofit solution is preferred.

FIG. 8 shows two possible attachment variants for the profiled struts 3 of the rack frame 4 with the additional profiled struts 15 of the additional frame 8. In the upper depiction, the rack frame 4 and the additional frame 8 are welded together along the edges shown with dashed lines. With this, a first weld seam is placed precisely between the outer edge 10 of rack frame 4 and the external profile side 25 of the additional frame 8. A second weld seam is placed between the inner peripheral side 27 of the rack frame 4 and an adjoining aligned profile side 32 of the additional frame 8.

The lower illustration shows that the rack frame 4 and the additional frame 8 can also be screw-connected with each other. The screw connection is made exactly between the support side 5 of the profiled strut 3 and a profile side of the additional profiled strut 15 which adjoins thereon in a form-fitting fashion. Tool apertures 33, enabling the driving of a bolt 35 or the like, using a screwdriver, are formed in an additional profile side of the profiled strut 3, placed parallel at a distance from the support side, in the threading direction, in front of the corresponding screw apertures in the support side 5 and the additional profile 15.

FIG. 9 illustrates the assembly of a rack 1 consisting of main frame 2 and additional frame 8 on a switchgear cabinet base 21, after the main frame 2 and the additional frame 8 have first been connected to each other. For this, the additional frame 8, in a corner area has an aperture 20, which aligns with a corresponding threaded opening 37 in a base corner piece 36 of a switchgear cabinet base 21. For the making of a durable connection, the additional frame 8 and the base corner piece 36 are screwed together by means of a bolt 35, which projects through aperture 20 into the threaded opening 37, while using a lock washer 34.

FIG. 10 shows an embodiment in which the additional frame 8 is a bottom frame, on which the main frame 2 is placed. The additional frame 8, in a corner area, has a vertical aperture 20, by means of which it can be secured, for example, to a switchgear cabinet base (see FIG. 9). The additional frame 8 has four profiled struts 15 that at their ends are angled at 45° to their direction of extension, which are connected at their ends with each other by means of a corner piece 16, forming a 90° angle. The angled profile ends have a cutout 22, so that with the profiled struts 15 that are connected with each other by means of the corner piece 16, the cutouts 22 of profiled struts 15 adjoining each other form an aperture 20. The corner piece 16 has a connection piece 17 which extends vertically and penetrates by means of a cutout 18 in the corner area 19 of receptacle 7, into the rack frame 4, and is received there in form-fitting and/or force-fitting fashion. The corner piece 16 additionally has a tab 23 with an additional aperture 24, whereby the tab 23 extends into the profiled struts 15 by means of the angled ends of the same. The apertures 20 and 24 are precisely so arranged that they align with each other, so that when the additional frame 8 is screw-connected, the corner piece 16 is precisely pre-positioned in reference to the profiled strut 15 of additional frame 8.

FIGS. 11-13 show possible geometries for the profiled strut 3 of the rack frame 4 and the profiled struts 15 of the additional frame 8. What is common to all the embodiments is that an external profile side 9 of the rack frame 4, which, for example, forms a footprint surface of the profile frame, is aligned with an external profile side 25 of the profiled struts 15, so that the sides 9 and 25 form a flat support surface. In addition, the geometries of an insertion section of the additional frame 8 are so configured that they fill the receptacle 7 of the rack frame 4 as completely as possible. Moreover, the additional frame 8 always adjoins the inner peripheral side 27 of the rack frame 4. In the embodiment according to FIG. 11, the assembly and/or support side 14 of the additional frame 8 aligns with a profile side of the rack frame 4 that adjoins thereon, to thus offer a support for switchgear cabinet components with as large a surface as possible.

The embodiment according to FIG. 12 shows a rack frame 4, in which the profiled strut 3 is designed for particularly heavy vertical loads, and for this, in its interior, has a dual-layer rib extending in the vertical direction from a horizontal surface of the profile, which on the inner side braces on the external profile side 9. The additional frame 8 has an assembly and/or support side 14, which extends perpendicular to an inner peripheral side 27 of rack frame 4, and thus, within the periphery formed by the rack frame 4, makes an assembly surface with assembly openings 28 available. Another variant is shown in FIG. 13.

The features of the invention disclosed in the above specification, in the drawings and in the claims, can be essential for implementation of the invention, both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A rack for a switchgear cabinet arrangement, comprising a main frame that includes four vertical profiled struts and eight horizontal profiled struts, four of said horizontal profiled struts forming a rectangular rack frame comprising a constant cross section, and wherein the rack frame comprises a peripheral receptacle which is formed by at least two profile sides of each of the four of said horizontal profiled struts and is open downwardly from a bottom portion of the rack frame, wherein a rectangular additional frame is inserted within the peripheral receptacle, wherein the additional frame is a base frame on which the main frame is placed, wherein the additional frame includes vertical apertures through which the additional frame is secured on a switchgear cabinet base underneath the additional frame.

2. The rack of claim 1, wherein the at least two profile sides of each of the four of said horizontal profiled struts includes a support side and a connection side that connects the support side to an external profile side or an external edge of each of the four of said horizontal profiled struts of the rack frame.

3. The rack of claim 2, wherein the support side and the connection side of each of the four of said horizontal profiled struts form support surfaces on which the additional frame adjoins, and extend from one another at an 90° angle.

4. The rack of claim 3, wherein the additional frame adjoins to at least one of the support surfaces by means of a sealing agent.

5. The rack claim 1, wherein a channel is defined in the receptacle between the rack frame and the additional frame.

6. The rack of claim 1, wherein the additional frame projects beyond an inner periphery of the rack frame and includes a support side that abuts the rack frame.

7. The rack of claim 1, wherein the additional frame includes four additional profiled struts which are connected by corner pieces, wherein at least one of the corner pieces includes a connection piece which is configured to be inserted into a cutout in a corner area of the rack frame to penetrate into the rack frame.

8. The rack of claim 1, in which the additional frame includes four additional profiled struts each having 45° angled ends, which are each connected at by a corner piece forming 90° angle corners, and wherein the ends of the additional profiled struts each have a cutout, so that when the additional profiled struts are connected with each other by means of the corner pieces, the cutouts of two corresponding additional profiled struts form one of the apertures.

9. The rack of claim 8, wherein the corner pieces each include a tab with at least one additional aperture, wherein by means of the angled ends of the additional profiled struts, the tabs extend into the additional profiled struts, and wherein one of the apertures in the additional frame aligns with the additional aperture in one of the tabs.

10. The rack of claim 1, in which the additional frame is received in form-fitting fashion into the peripheral receptacle.

11. The rack of claim 1, wherein the peripheral receptacle has a first dimension in a direction of insertion of the additional frame into the peripheral receptacle that is substantially equal to a measurement of the additional frame in the direction of insertion.

12. The rack of claim 2, wherein, for each of the four of said horizontal profiled struts, the support side extends perpendicular to a direction of insertion of the additional frame into the peripheral receptacle and the connection side extends parallel to the direction of insertion.

13. The rack of claim 12, wherein, for each of the four of said horizontal profiled struts, the support side transitions at opposing edges to an inner peripheral side of the rack frame and into the connection side, wherein the inner peripheral side extends parallel to the connection side, and wherein the connection side and the inner peripheral side are arranged offset to each other by the dimension of the support side.

14. The rack of one of claim 1, wherein the cross section of the rack frame is a closed profile cross section and the additional frame comprises an open profile cross section, wherein an open profile side of the additional frame is closed off by at least one closed profile side of the peripheral receptacle of the rack frame when the additional frame is received in the peripheral receptacle.

15. The rack of claim 1, wherein the additional frame includes an insertion section, by means of which the additional frame is inserted into the peripheral receptacle, and an attachment section with assembly openings, wherein the attachment section of the additional frame projects beyond an inner peripheral side of the rack frame.

* * * * *